United States Patent [19]
Poulin et al.

[11] Patent Number: 4,894,044
[45] Date of Patent: Jan. 16, 1990

[54] HOMOKINETIC JOINT COMPRISING AN AXIALLY RETAINED TRIPOD ELEMENT

[75] Inventors: Bernard Poulin, Conflans Ste Honorine; Francois Verbrugge, Cergy, both of France

[73] Assignee: Glaenzer-Spicer, Poissy, France

[21] Appl. No.: 249,558

[22] Filed: Sep. 26, 1988

[30] Foreign Application Priority Data

Oct. 1, 1987 [FR] France .................................. 87 13595

[51] Int. Cl.⁴ .............................................. F16D 3/30
[52] U.S. Cl. .................................... 464/111; 464/905
[58] Field of Search ............................... 464/111, 905

[56] References Cited

U.S. PATENT DOCUMENTS 4,205,539 6/1980 Orain .................................... 464/111

FOREIGN PATENT DOCUMENTS

2133042 11/1972 France .
2398924 2/1979 France .
2402110 3/1979 France .
2512140 3/1983 France .

*Primary Examiner*—Daniel P. Stodola
*Attorney, Agent, or Firm*—Wenderoth, Lind & Ponack

[57] ABSTRACT

The homokinetic joint has a tripod element connected to one of two shafts to be coupled and a tulip element connected to the other of the shafts. The tripod element includes three trunnions on which are rotatively mounted rollers received in three rolling ways provided in the tulip element. An axial retaining device is provided for maintaining the axial connection of the two parts of the joint and includes an intermediate element defining a convex spherical outer surface received in a concave spherical recess provided in axial branches of the tulip element. The intermediate element has three notches for introducing the three trunnions of the tripod element into the intermediate element and a first planar surface extending perpendicular to the axis of the tripod element and cooperating with a first zone of contact confronting the tripod element. A device is provided for axially retaining the tripod element in the intermediate element. According to the invention, the three introducing notches open into an equatorial cavity in which the tripod element is movable in a direction perpendicular to its axis, the first planar surface being provided on an inner end of the cavity.

17 Claims, 5 Drawing Sheets

HOMOKINETIC JOINT COMPRISING AN AXIALLY RETAINED TRIPOD ELEMENT

BACKGROUND OF THE INVENTION

The present invention relates to a homokinetic joint comprising an element having the shape of a tripod connected to one of two shafts to be coupled and a tulip element connected to the other of said shafts, the tripod element having three trunnions on which are rotatively mounted rollers received in three rolling ways provided in the tulip element, and axial retaining means for maintaining an axial connection of the two parts of the joint.

French patent application FR-A-2,398,924 describes and shows a homokinetic joint of this type in which the rolling ways comprise tracks having a circular cross section and the axes X—X of which are parallel to the axis of the shaft connected to the tulip element, and the axial retaining means comprise an intermediate element defining a convex spherical outer surface received in a concave spherical cavity provided in axial branches of the tulip element.

In the embodiment shown in FIGS. 7 and 8 of this document, the intermediate element has three slots or notches in which the three trunnions of the tripod element are received and a first planar surface perpendicular to the axis of the tripod element. A first contact zone confront the tripod element to enable the latter to move in a plane perpendicular to its axis. And, a device is provided for axially retaining the tripod element in the intermediate element.

In order to enable the tripod element to move in a direction perpendicular to its axis, the three slots in which the three trunnions of the tripod element are received are so dimensioned as to provide the clearances required for the necessary relative movement between these two elements to permit flexing the two parts of the joint at an angle. This very important dimensioning of the slots contributes to a reduction in potential size of the convex spherical outer bearing surface of the intermediate element in the concave equatorial spherical recess provided in the axial branches of the tulip element and consequently a reduction in the potential maximum flexing angle of the homokinetic joint.

The overdimensioned slots relative to the outside diameter of the trunnions, in practice require arranging the axial retaining device of the tripod element in the inner end of the intermediate element, i.e. at the end remote from the end through which the tripod element is introduced. This structure on the one hand has a drawback in that the assembly of the homokinetic joint is rendered very complex, since access to the mechanical connecting means constituting the axial retaining device is very difficult during the assembling operation, and on the other hand in that it requires axially offsetting the plane of the zones of contact between the tripod element and the intermediate element relative to the equatorial plane of the latter. Furthermore, the retaining device proposed in this document requires the provision of an aperture at the inner end of the intermediate element which weakens the structure and again reduces the convex spherical outer bearing surface thereof.

It was also proposed in FIGS. 9 to 11 of this document to construct the intermediate element in three segments each having a spherical wall constituting a ball joint and two end walls defining parallel planar surfaces adapted to cooperate with lateral contact zones confronting the tripod element. While this solution overcomes some of the aforementioned drawbacks, it is very complex with respect to both the realization of the segments and their assembling and mounting.

SUMMARY OF THE INVENTION

An object of the invention is therefore to provide a homokinetic joint which overcomes the aforementioned drawbacks and has a simple structure and is easy to assemble.

The invention therefore provides a homokinetic joint which comprises a tripod element connected to one of the two shafts to be coupled and a tulip element connected to the other of said shafts, the tulip element comprising three trunnions on which are rotatively mounted rollers received in three rolling ways provided in the tulip element, and axial retaining means for maintaining an axial connection of the two parts of the joint. The axial retaining means comprises an intermediate element defining a convex spherical outer surface received in a concave spherical recess provided in axial branches of the tulip element, the intermediate element comprising three notches for introducing the three trunnions of the tripod element into the intermediate element during assembly, a first planar surface extending perpendicular to the axis of the tripod element and which surface cooperates with a first zone of contact confronting the tripod element, and a device for axially retaining the tripod element in the intermediate element. The three introducing notches open into an equatorial cavity in which the tripod element is movable in a direction perpendicular to its axis, and said first planar surface is defined at an inner end of the cavity.

According to another feature of the invention, the axial retaining device for the tripod element comprises a retaining element which traps the tripod element in the equatorial cavity, said retaining element defining a second planar surface which is parallel to the first planar surface of the cavity and cooperates with a second zone of contact confronting the tripod element. The first and second planar surfaces of the equatorial cavity may be arranged symmetrically relative to the equatorial plane of the intermediate element.

In this embodiment of the invention, the tripod introducing notches are so dimensioned as to permit the simple axial introduction of the latter into the intermediate element, the movement of the tripod element relative to the tulip element occurring in the equatorial cavity. The retaining element of the tripod element which closes the equatorial cavity after the tripod element has been placed in position in said cavity, may be easily placed in position when assembling the homokinetic joint.

According to another feature of the invention, the equatorial cavity is transversely defined by portions of cylindrical surfaces complementary to the outer cylindrical surfaces of each of the trunnions of the tripod element. The portions of cylindrical surfaces are constituted by three pairs of surfaces, each pair comprising two surfaces having axes parallel to an equatorial radius and spaced apart a distance greater than the outside diameter of the corresponding trunnion, the pairs of surfaces being evenly spaced 120° apart.

The contact zones confronting the tripod element and defining a planar contact area between the tripod element and the planar surfaces of the intermediate element may, for example, each be in part defined by a planar surface provided on the tripod element.

According to the invention, each of the planar surfaces provided on the tripod element is constituted by a flat surface extending from the hub of the tripod element to the end of each of the trunnions. This further feature advantageously solves the problem of the lubrication of the rollers of the tripod element, since each of the flat surfaces permits the passage, during the operation of the joint, of the lubricating agent from the center of the joint to the interior of the cylindrical bore of each of the rollers.

According to a preferred embodiment, the rolling ways are tracks having a substantially toroidal shape in which the rollers, whose outer surfaces are spherical, roll. The geometric center of the substantially toroidal tracks may coincide with the geometric center of the concave spherical reces.

BRIEF DESCRIPTION OF THE DRAWINGS

Further features and advantages of the invention will be apparent from the following detailed description with reference to the accompanying drawings, in which.

DETAILED DESCRIPTION OF THE PREFERRED EMBODIMENTS

Figures 1, 2, 3:
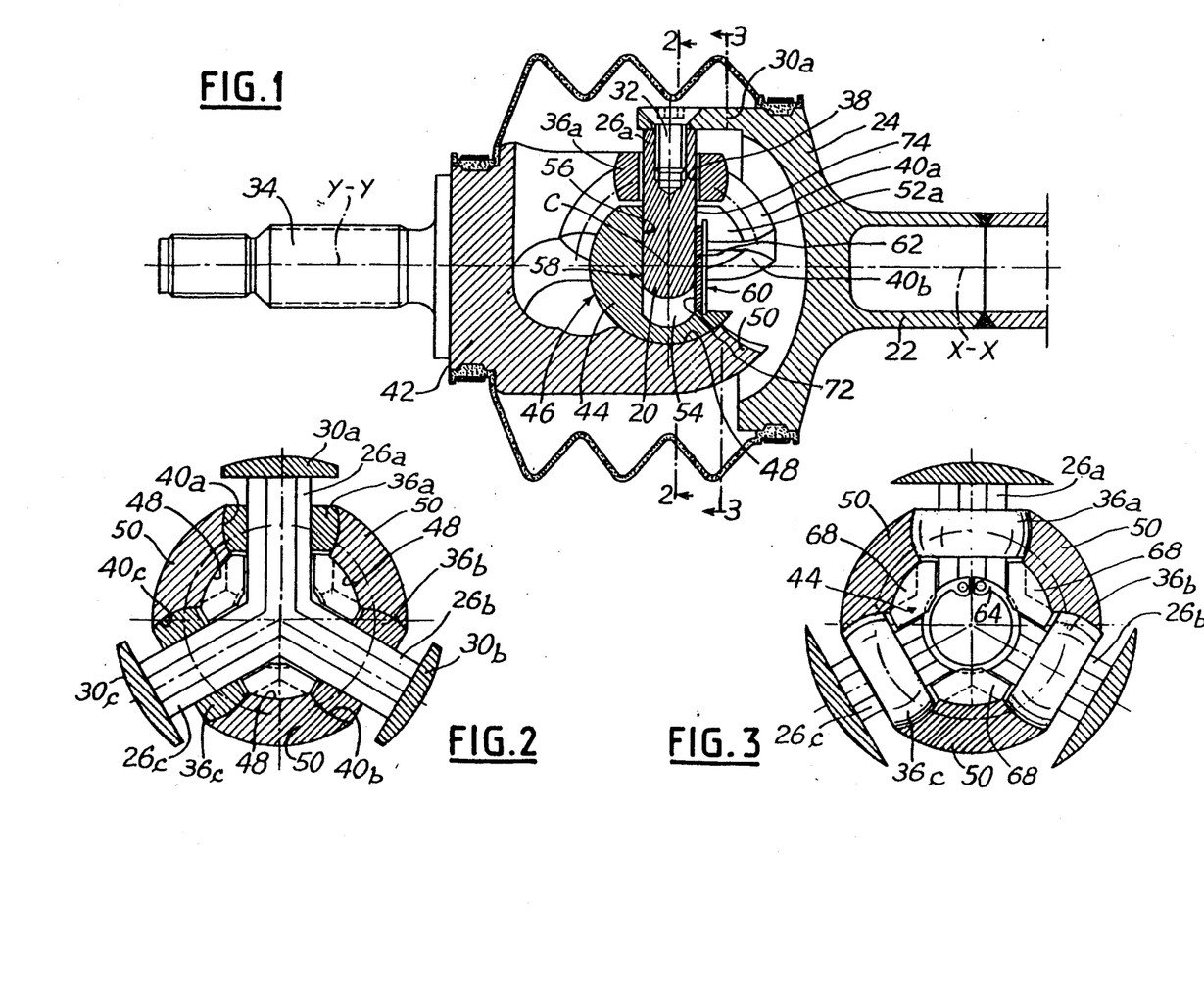
FIG. 1 is an axial sectional view of the homokinetic joint according to the invention in which the two parts of the joint are in axial alignment with each other.
FIG. 2 is a partial sectional view taken on line 2—2 of FIG. 1.
FIG. 3 is a partial sectional view taken on line 3—3 of FIG. 1.

FIG. 1 shows a tripod homokinetic joint having a large flexing angle in which the two joint parts are axially retained accordance with the present invention.

The joint comprises a tripod element 20 which is rotatably supported by a tubular shaft 22 through a bowl element 24. The tripod element 20 comprises three trunnions 26a, 26b and 26c which are evenly spaced 120° apart and interconnected by a central hub 28. The bowl element 24 has three axial branches 30a, 30b and 30c to which the trunnions are connected, for example by screws 32.

The tubular shaft 22 having an axis X—X rotates a solid shaft 34 having an axis Y—Y through three rollers 36a, 36b and 36c rotatively and slidably mounted on the trunnions 26a, 26b and 26c, respectively. Each of the rollers has a cylindrical bore 38 into which the corresponding trunnion extends. For the purpose of rotating the shaft 34, each of the rollers is received in a rolling way 40a, 40b and 40c formed in a tulip element 42 which extends from the solid shaft 34.

In the embodiment shown in the drawings, the rolling ways are tracks having a substantially toroidal shape on which the rollers, whose outer surfaces are spherical, roll. The geometric center C of the toroidal tracks is located on the axis Y—Y of the shaft 34. When applied to a front-wheel drive motor vehicle, the solid shaft 34 constitutes the stub-axle which drives a wheel (not shown), the hollow tubular shaft 22 being connected to the output of the transmission differential.

The homokinetic joint comprises axial retaining means for maintaining the axial connection of the two parts of the joint while allowing these parts to flex relative to each other.

These axial retaining means comprise an intermediate element 44 defining a convex spherical outer surface 46. The convex spherical outer surface 46 is received in a concave spherical recess 48 provided in three axial branches 50 of the tulip element 42. The geometric center of the concave spherical recesses 48 coincides with the geometric center C of the toroidal tracks 40a, 40b and 40c.

The intermediate element 44 shown in FIGS. 4 to 8 define three introducing notches 52a, 52b and 52c through which pass the three corresponding trunnions of the tripod element when the latter is introduced into the intermediate element. The axis Z—Z which remains parallel to the axis X—X of the hollow tubular shaft 22 irrespective of the angular position of the axis X—X relative to the axis Y—Y, is referred to as the polar axis of the intermediate element 44, and the plane P perpendicular to the polar axis Z—Z passing through the geometric center D of the spherical intermediate element 44 is referred to as the equatorial plane of the intermediate element.

Figures 5, 6, 7, 8:
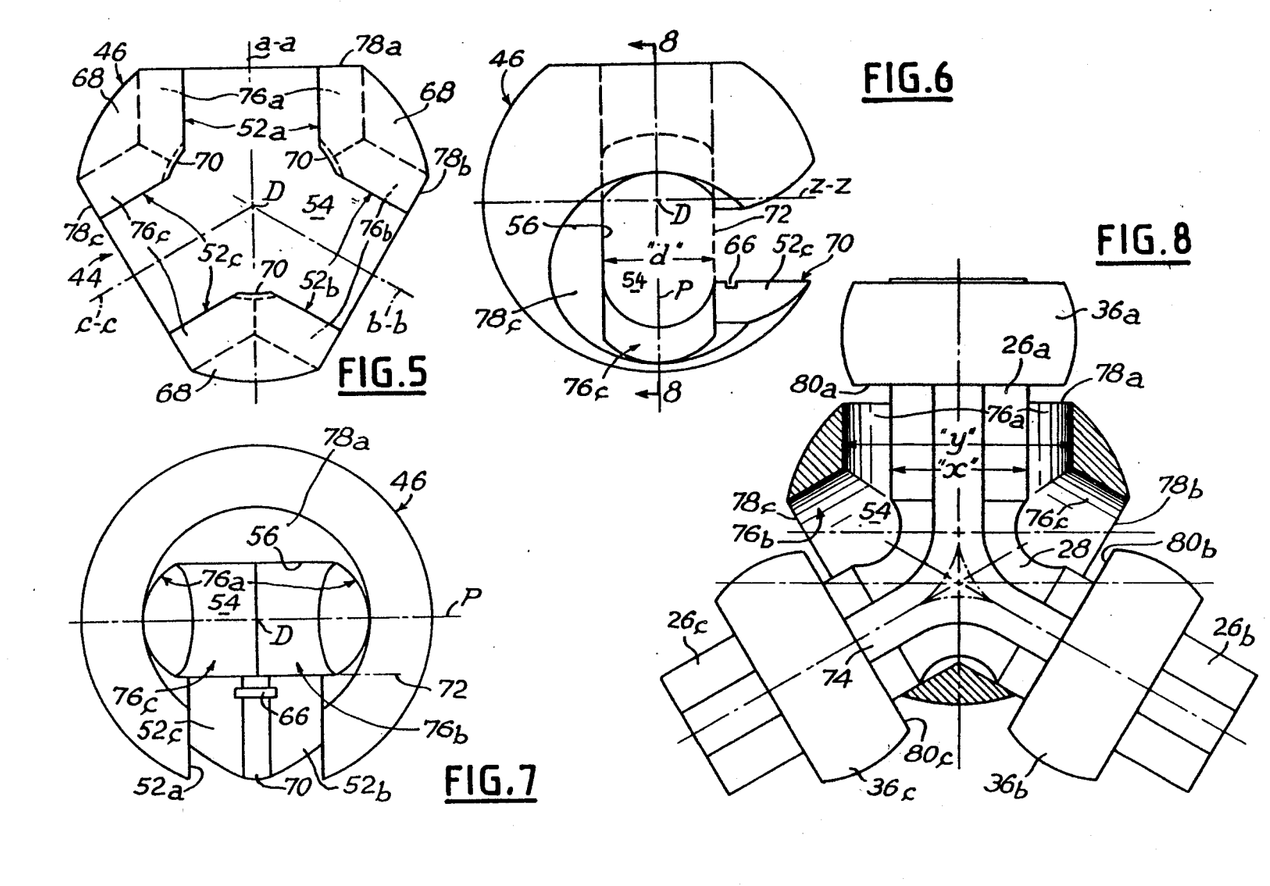
FIG. 5 is an end elevational view of the intermediate element of the homokinetic joint of FIG. 1.
FIG. 6 is a left side elevational view of the intermediate element of FIG. 5.
FIG. 7 is a plan view of the intermediate element of FIG. 5.
FIG. 8 is a sectional view, taken on line 8—8 of FIG. 6, of the intermediate element and in which the tripod element and its rollers are shown in a position corresponding to that which they occupy when the homokinetic joint assumes the maximum flexing angle.

As viewed in FIG. 6, the introducing notches extend in a direction parallel to the polar axis Z—Z from the right to an equatorial cavity 54 into which they open and in which the tripod element 20 is capable, after having been axially introduced therein through the introducing notches 52, of moving in a direction perpendicular to its axis, i.e. in a direction parallel to the equatorial plane P.

The equatorial cavity 54 is axially defined on the left, as viewed in FIG. 6, by an inner end surface 56 extending perpendicular to the polar axis Z—Z so as to provide a first planar guide surface for guiding the movements of the tripod element 20. This first planar guide surface 56 cooperates with a corresponding first planar surface 58 of the tripod element which is perpendicular to the polar axis of the intermediate element for guiding the movement of the tripod element within the equatorial cavity 54 of the intermediate element 44 in a plane perpendicular to the axis of the tripod element. The zone of contact between the tripod element and the first planar surface 56 of the intermediate element detained at the first planar surface 58 may be instead, by way of example, be defined by three coplanar outer generatrices of the three trunnions which would constitute a planar guide on an equivalent plane in cooperation with the planar surface 56.

The equatorial cavity 54 is axially defined on the right, as viewed in FIGS. 1 and 6, by a retaining element 60 which traps the tripod element 20 in the equatorial cavity. The the embodiment shown in FIGS. 1 to 11, the retaining element 60 is formed by a solid disc 62 which is held in position by a resilient ring 64 mounted in a groove 66 in the intermediate element 44. In order to permit the mounting of the closing disc 62 in the intermediate element 44 by inserting it in a direction parallel to the polar axis Z—Z, each of the three segments 68, defining the axial notches 52a, 52b and 52c, includes an axial cylindrical portion 70 whose diameter corresponds to the outside diameter of the disc 62 and in which the three portion of the groove 66 are formed.

Figure 4:
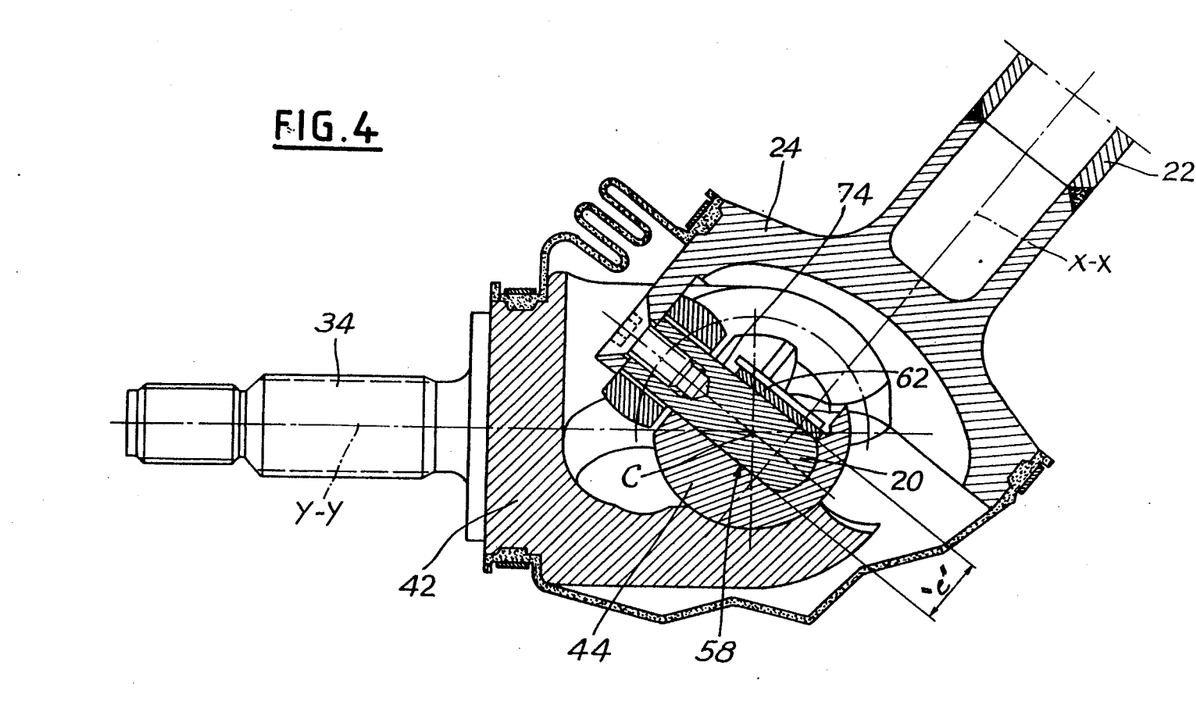
FIG. 4 is a view similar to FIG. 1, the joint being shown at its maximum flexing angle.

The left side, as viewed in FIGS. 1 and 4, of the disc-shaped retaining element 62 constitutes a second planar surface 72 for guiding the tripod element 20 and which surface is parallel to the first planar surface defined by the axially inner end surface 56 of the equatorial cavity 54. The second planar surface 72 cooperates with a corresponding second planar surface 74 provided on the tripod element 20 which forms a second contact zone provided on the tripod element and extending parallel to the first planar surface 58.

As can be seen in particular in FIG. 6, in which the second planar surface 72 has been shown symbolically by a dot-dash line, the first and second planar surfaces 56 and 72 are advantageously disposed symmetrically on each side of the equatorial plane P of the intermediate element 44. These two planar surfaces 56 and 72 are axially spaced apart a distance "d" which is substantially equal to the axial thickness "e" between the first and second parallel guide surfaces 58 and 74 of the tripod element 20 (FIG. 4).

Each of the planar surfaces 58 and 74 provided on the tripod element 20 is constituted by a flat face extending from the hub of the tripod element 28 to the free end of each of the trunnions 26a, 26b and 26c. These flat faces, which may be for example formed by milling each of the lateral sides of the tripod element 20, enable joint-lubricating agent to enter the interior of the cylindrical bore 38 of each of the rollers and ensure the lubrication thereof during the operation of the homokinetic joint, the axial thickness "e" of the tripod element 20 being less than the outside diameter "x" of each of the trunnions.

The equatorial cavity 54 of the intermediate element 44 is transversely defined by portions of cylindrical surfaces whose contour is complementary to the outer cylindrical surfaces of each of the trunnions of the tripod element 20, i.e. it has a substantially equal radius, The portions of the cylindrical surfaces are constituted by three pairs of surfaces 76a, 76b and 76c. Each of the pairs of surfaces, for example 76a, comprises two surfaces which have axes parallel to an equatorial radius, for example a—a, and which are spaced apart a distance "y" exceeding the outside diameter "x" of the corresponding trunnion, for example trunnion 26a. The pairs of surfaces 76a, 76b and 76c are evenly spaced 120° apart around the polar axis Z—Z and coincide with the corresponding axial notches 52a, 52b and 52c.

FIG. 8 shows a maximum eccentric position that the tripod element 20 is capable of occupying within the equatorial cavity 54. In this position, the outer cylindrical surfaces of the trunnions 26b and 26c abut the adjacent portions of surfaces 76b and 76c. The tripod element may of course occupy any position in the equatorial cavity 54 intermediate a position of maximum eccentricity, such as the one shown in FIG. 8, and the median position it occupies when the homokinetic joint parts are aligned as shown in FIG. 1.

In order to ensure a correct angular positioning of the intermediate element for a given flexing angle of the joint, the intermediate element is provided with three planar zones 78a, 78b and 78c. Each of the planar zones, for example the zone 78a, extends in a plane perpendicular to the equatorial radius, for example a—a, of the corresponding portions of cylindrical surfaces, for example 76a. Each of the surfaces 78a, 78b and 78c respectively cooperates with the confronting end surfaces 80a, 80b and 80c, of the corresponding rollers 36a, 36b and 36c, as can be seen in FIG. 8, although the clearance between each planar zone 78 and the confronting end surface 80 of the corresponding roller 36 is shown larger than actual in order to facilitate the illustration.

The planar zones 78a, 78b and 78c also permit the axial introduction of the intermediate element 44 in the concave equatorial cavity 48 when assembling the homokinetic joint and ensure the locking thereof in position under the rotation of the equatorial cavity through an angle of 60° similar to a bayonet coupling.

Figure 12:
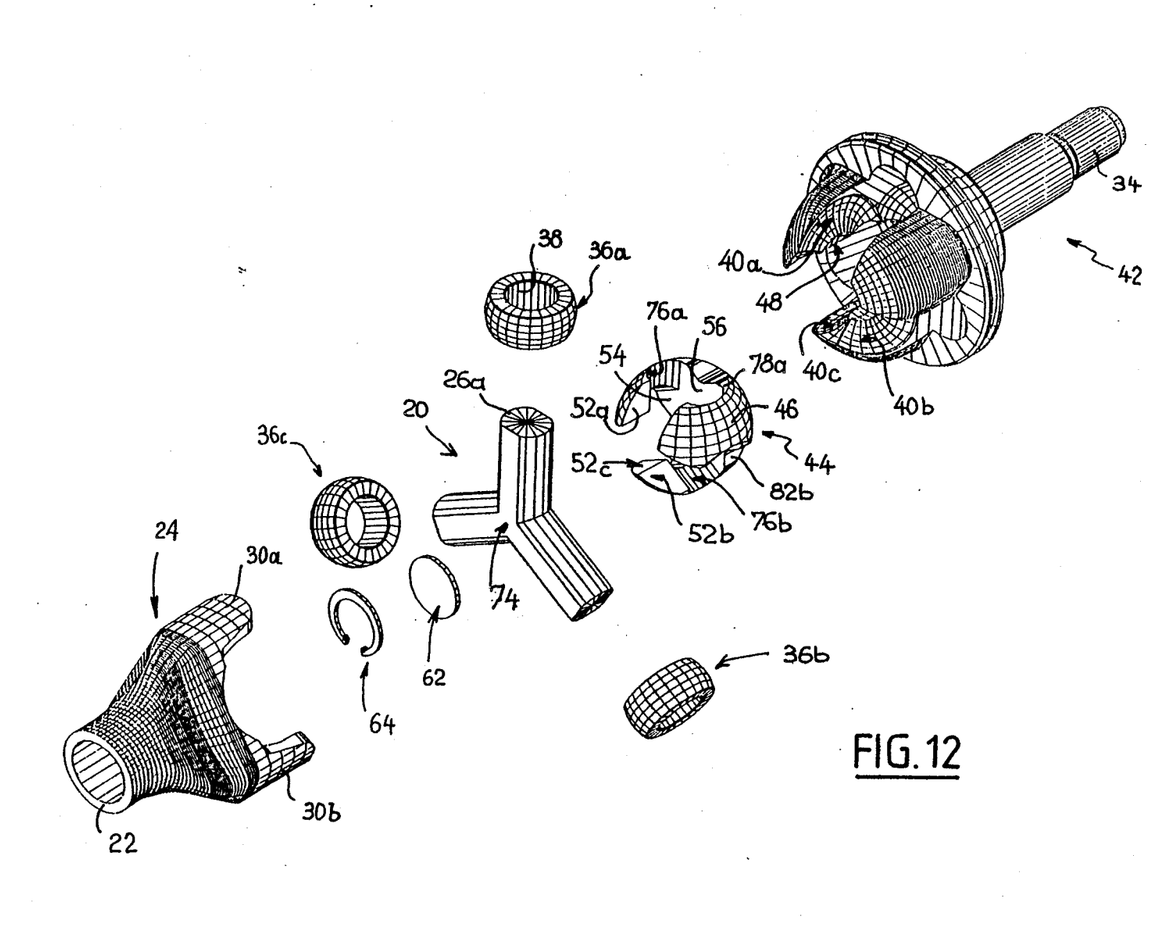
FIG. 12 is an exploded perpective view of the main components of the homokinetic joint according to the invention.

The shapes and the structure of the intermediate element 44 are clearly shown in FIG. 12 in which the bowl element and the tulip element have optimized outer contours to permit a maximum flexing angle of about 52°.

Figure 9:
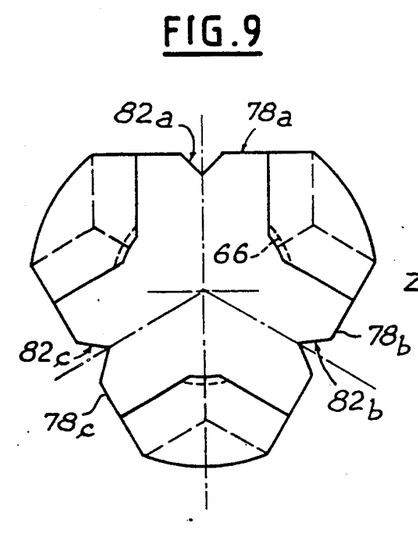
FIGS. 9, 10 and 11 are views similar to FIGS. 5, 6 and 7 showing a modification of the intermediate element of the homokinetic joint according to the invention.
Figure 10:
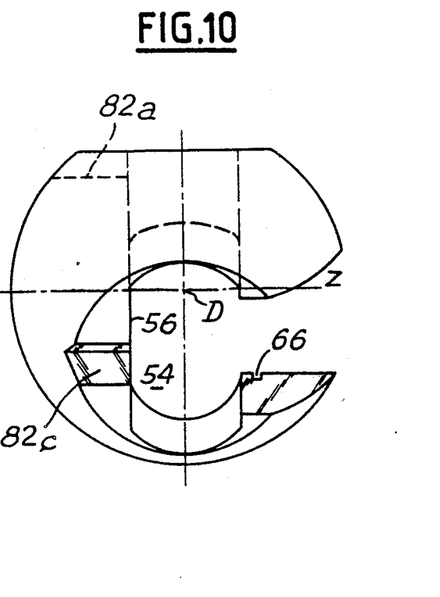
Figure 11:
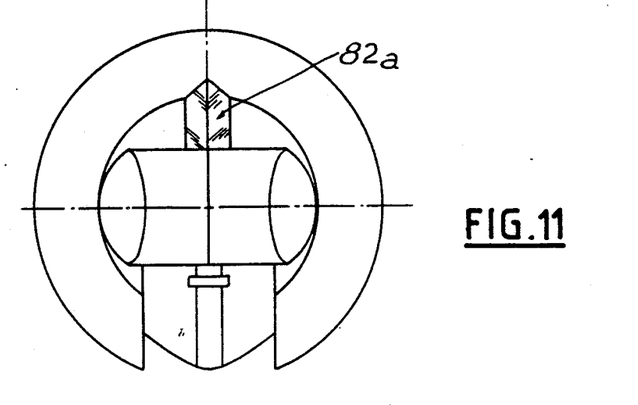

In order to still further increase the maximum flexing angle of the homokinetic joint according to the invention, there is shown in FIGS. 9 to 11 a modified version of the intermediate element 44. In this embodiment, each of the planar zones 78a, 78b and 78c includes an axially open groove 82a, 82b, 82c extending in a direction parallel to the polar axis Z—Z. Each of these grooves has, in the equatorial plane, a V-shaped cross section and extends axially from the inner end 56 of the equatorial cavity 54 toward the right as viewed in FIG. 10. The V-shaped cross section of each of these grooves is also centered relative to the corresponding equatorial radius.

The design of the homokinetic joint described above has several important advantages.

The joint easily allows very large flexing angles of the joint which may be as much as 52°.

The large dimensions of the component parts and the absence of a fragile zone, in particular in the intermediate element 44, enables this type of homokinetic joint to be employed for transmitting a very high driving torque. The joint is highly reliable due to the fact that, at each instant, the relative positioning of the moving components is determined in a unique way by the various aforementioned guide surfaces and zones.

The large size of the guide and bearing surfaces and zones ensures a very high resistance to wear of the axial retaining system contributing to a long operating life and a consistency in the geometric characteristics of the homokinetic joint.

The easy lubrication of the component parts remote from the axis of rotation of the joint, such as the rollers, avoids having to completely fill the interior of the homokinetic joint with lubricant, resulting in considerable savings in the amount of lubricant to be employed.

The various component parts of the homokinetic joint are very easily assembled, in particular due to the planar guide zones which cooperate with the rollers when they are placed in position in the tulip element.

We claim:

1. A homokinetic joint for coupling two shafts, said joint comprising:

a tulip element connectable to a first shaft, said tulip element comprising a plurality of branches extending axially of said element and collectively defining a concave spherical recess therewithin, and said tulip element defining three rolling ways;

a tripod element connectable to a second shaft to be coupled to the first shaft, said tripod element comprising three trunnions and rollers rotatively mounted to said trunnions, said rollers disposed and rollable on said rolling ways; and axial retaining means connected between said tripod element and said tulip element for positioning said tripod element relative said tulip element, said axial retaining means including an intermediate element disposed in said concave spherical recess defined by the branches of said tulip element and in which intermediate element said tripod element is received, and a retaining element restraining said tripod element from moving axially relative to said intermediate element, said intermediate element having an outer surface portion having the shape of a portion of a sphere so as to be complementary to said spherical recess and confronting said tulip element at said spherical recess, said intermediate element defining an equatorial cavity therein in which said tripod element is received and is movable relative to said intermediate element in directions lying in a plane extending perpendicular to the axial direction in which said tripod element is restrained from moving by said retaining element, and said intermediate element defining three notches therein open to said equatorial cavity for facilitating the insertion of said tripod element into said cavity, said notches having widths that are only slightly larger than the outer diameters of said trunnions, respectively, and said tripod element being substantially immovable relative to said intermediate element in said directions when disposed in said notches yet movable in said directions once said tripod element has been inserted into said cavity through said notches.

2. A homokinetic joint as claimed in claim 1, wherein the thickness of said tripod element in said axial direction is less than the largest outer diameter of each of said trunnions.

3. A homokinetic joint as claimed in claim 1, wherein each of said rolling ways is a track having a substantially toroidal shape, and each of said rollers has an outer rolling surface having the shape of a portion of a sphere.

4. A homokinetic joint as claimed in claim 3, wherein the geometric center of each said track is coincident with the geometric center of the spherical recess defined within the branches of said tulip element.

5. A homokinetic joint as claimed in claim 1, wherein each of said trunnions has an outer cylindrical surface, and said intermediate element defines therein portions of cylindrical surfaces extending radially from said equatorial cavity and which portions of cylindrical surfaces are respectively complementary to the outer cylindrical surfaces of said trunnions.

6. A homokinetic joint as claimed in claim 5, wherein said portions of cylndrical surfaces are constituted by three pairs of portions of cylindrical surfaces, the two portions of cylindrical surfaces of each said pair having axes about which said surfaces are curved and which axes are parallel to a respective equatorial radius extending through the geometric center of said intermediate element, each said pair having a collective width as taken in direction transverse to the respective equatorial radius that is greater than the outer diameter of a respective one of said trunnions, and said pairs being collectively spaced 120° apart from one another with respect to the geometric center of said intermediate part.

7. A homokinetic joint as claimed in claim 6, wherein said intermediate element defines three planar zones extending on the outer surface thereof perpendicular to a respective said equatorial radius, and each of said rollers has an end face confronting a respective one of said planar zones.

8. A homokinetic joint as claimed in claim 7, wherein said intermediate element has a respective groove extending therein from said equatorial cavity to each of said planar zones.

9. A homokinetic joint as claimed in claim 1, wherein said intermediate element comprises a first planar surface defining an end of said cavity, said first planar surface extending perpendicular to said axial direction, and a first zone of contact being defined between said first planar surface and said tripod element.

10. A homokinetic joint as claimed in claim 9, wherein said tripod element has a first planar surface extending perpendicular to said axial direction, said first zone of contact defined between said first planar surfaces.

11. A homokinetic joint as claimed in claim 10, wherein said tripod element has a hub and the first planar surface of said tripod element extends from said hub to a free end of each of said trunnions.

12. A homokinetic joint as claimed in claim 9, wherein said retaining element comprises a planar surface extending parallel to said first planar surface, and a second zone of contact is defined between said planar surface of said retaining element and said tripod.

13. A homokinetic joint as claimed in claim 12, wherein said first planar surface and the planar surface of said retaining element are disposed symmetrically about an equatorial plane extending through the geometric center of said intermediate element.

14. A homokinetic joint as claimed in claim 12, wherein said intermediate element has a locking groove extending therein, and said retaining element comprises a disc positioned on said intermediate element and a resilient ring mounted to said intermediate element in said locking groove and retaining said disc in position on said intermediate element.

15. A homokinetic joint as claimed in claim 12, wherein said tripod element has a planar surface extending perpendicular to said axial direction, said second zone of contact being defined between said planar surface of said retaining element and said planar surface of said tripod element.

16. A homokinetic joint as claimed in claim 15, wherein said tripod element has a hub and the planar surface of the tripod element extends from said hub to a free end of each of the trunnions.

17. Front-wheel drive structure of a motor vehicle in which power is transmitted from a transmission differential of the vehicle to a front wheel of the vehicle, said structure comprising:

a stub-axle of the front wheel of the vehicle;

an output member of the transmission differential of the vehicle; and a homokinetic joint connecting said stub-axle to said output member, said homokinetic joint including a tulip element connected to said stub-axle, said tulip element comprising a plurality of branches extending axially of said element and collectively defining a concave spherical recess therewithin, and said tulip element defining three rolling ways, a tripod element connected to said output member, said tripod element comprising three trunnions and rollers rotatively mounted to said trunnions, said rollers disposed and rollable on said rolling ways, and axial retaining means connected between said tripod element and said tulip element for positioning said tripod element relative said tulip element, said axial retaining means including an intermediate element disposed in said concave spherical recess defined by the branches of said tulip element and in which intermediate element said tripod element is received, and a retaining element restraining said tripod element from moving axially relative to said intermediate element, said intermediate element having an outer surface portion having the shape of a portion of a sphere so as to be complementary to said spherical recess and confronting said tulip element at said spherical recess, said intermediate element defining an equatorial cavity therein in which said tripod element is received and is movable relative to said intermediate element in directions lying in a plane extending perpendicular to the axial direction in which said tripod element is restrained from moving by said retaining element, and said intermediate element defining three notches therein open to said equatorial cavity for facilitating the insertion of said tripod element into said cavity, said notches having widths that are only slightly larger than the outer diameters of said trunnions, respectively, and said tripod element being substantially immovable relative to said intermediate element in said directions when disposed in said notches yet movable in said directions once said tripod element has been inserted into said cavity through said notches.

* * * * *